United States Patent [19]

Pea

[11] Patent Number: 5,711,144
[45] Date of Patent: Jan. 27, 1998

[54] POWER SUPPLY CHAIN WITH ROLLER BAR CARRIER AND ROLLER SEPARATOR

[75] Inventor: Kevin I. Pea, Mayville, Wis.

[73] Assignee: Hubbell Incorporated, Orange, Conn.

[21] Appl. No.: 657,062

[22] Filed: May 28, 1996

Related U.S. Application Data

[63] Continuation-in-part of Ser. No. 434,740, May 4, 1995.

[51] Int. Cl.⁶ .................................................. F16G 13/16
[52] U.S. Cl. ....................... 59/78.1; 59/900; 248/49
[58] Field of Search ..................... 59/78.1, 900; 248/49

[56] References Cited

U.S. PATENT DOCUMENTS

| | | |
|---|---|---|
| 3,098,349 | 7/1963 | Waninger . |
| 3,330,105 | 7/1967 | Weber . |
| 3,382,668 | 5/1968 | Berkes et al. . |
| 3,503,579 | 3/1970 | Kurlandsky . |
| 3,779,003 | 12/1973 | Boissevain et al. . |
| 3,848,407 | 11/1974 | Moritz . |
| 4,018,411 | 4/1977 | Hennig . |
| 4,104,871 | 8/1978 | Moritz . |
| 4,129,277 | 12/1978 | Tenniswood . |
| 4,198,812 | 4/1980 | Hennig et al. ..................... 59/78.1 |
| 4,392,344 | 7/1983 | Gordon . |
| 4,462,565 | 7/1984 | Johnson . |
| 4,626,233 | 12/1986 | Moritz . |
| 4,769,985 | 9/1988 | Moritz . |
| 4,789,120 | 12/1988 | Spidel . |
| 5,014,506 | 5/1991 | Moritz . |
| 5,020,313 | 6/1991 | Moritz et al. ..................... 59/78.1 |
| 5,048,283 | 9/1991 | Moritz et al. ..................... 59/78.1 |
| 5,108,350 | 4/1992 | Szpakowski . |
| 5,220,779 | 6/1993 | Tatsuta et al. ..................... 59/78.1 |

OTHER PUBLICATIONS

Gleason PowerTrak, Cable/Hose Carrier Reference Guide, Cover page and pp. 6, 8, 9, 10, 11, 23, 35; dated 1994.
Gleason PowerTrak GRP, Non–Metallic Cable/Hose Carrier, Cover page and pp. 6, 21, 27; dated 1994.

*Primary Examiner*—David Jones
*Attorney, Agent, or Firm*—Edward J. Timmer

[57] ABSTRACT

A power supply chain comprising a plurailty of power supply conduit carriers including first and second side links and first and second cross-pieces connected between the side links to form the carrier. The cross-pieces each comprise an elongated cross-piece member having a channel extending along the length of the member and a plurality of cylindrical rollers disposed end-to-end along the length of and residing in the channel for rotation in the channel relative to the cross-piece member. One or more roller separators are disposed transversely between facing cross-piece rollers in the cross-piece channels. Each roller separator typically includes an intermediate cylindrical roller region for engaging one or more power supply conduits and cylindrical end studs or shafts that are rotatably received in corresponding bores in the facing cross-piece rollers so that the separator roller can freely rotate on the cross-piece rollers.

11 Claims, 2 Drawing Sheets

POWER SUPPLY CHAIN WITH ROLLER BAR CARRIER AND ROLLER SEPARATOR

This application is a continuation-in-part of Ser. No. 08/434,740 filed May 4, 1995.

FIELD OF THE INVENTION

The present invention relates to a power supply chain having a plurality of carriers connected together for supporting one or more power supply conduits, such as power supply cables or hoses, in a manner to provide electrical, fluid or other power to a relatively movable power consumer.

BACKGROUND OF THE INVENTION

Power supply chains are well known for supporting one or more power supply cables, hoses, and the like between a stationary power source and a relatively movable power consumer, such as, for example, a crane, machine tool slide, etc. The power supply chain typically comprises a plurality of carriers pivotally connected end-to-end in some manner to form an elongated flexible support chain that extends from the statonary power source in a reverse bend to the power consumer to accommodate movement of the power consumer relative to the power source.

A carrier of the power supply chain typically comprises laterally spaced apart, parallel chain side links interconnected by a pair of cross-pieces that are fastened to the side links. The cross-pieces are spaced apart in a direction perpendicular to the length of the power supply chain to provide an opening in which one or more of the power supply conduits (e.g. cable or hose) are received, confined and supported along the length of the chain. One or more separators may be positioned between the cross-pieces in a direction perpendicular to the cross-pieces to define multiple openings for confining and grouping power conudits of one type (e.g. electrical cables) or size (e.g. large diameter) in an opening and one or more power conduits of different type (e.g. fluid hoses) or size (e.g. relatively small diameter) in another opening.

In the past, aluminum cross-pieces have been provided with low friction (e.g. nylon) stationary inserts to reduce wear of the power supply conduits as supported by the carriers. The plastic inserts may be of complex configuration to form circular openings to receive one or more power supply conduits, or simply elongated inserts for engaging the power supply conduits. The separators, if present, have been made of suitable plastic material to this same end. Moreover, cross-pieces each comprising a stationary, cylindrical metallic rod have been sheathed with a nylon sleeve that rotates on the rod.

Copending application Ser. No. 08/434,740 filed May 4, 1995, describes a power supply chain having improved carriers having a plurality of rollers disposed end-to-end in channels of the carrier cross-pieces in a manner to reduce frictional wear of one or more power supply conduits supported by the chain and to simplify construction of the chain carriers as well as their maintenance.

An object of the present invention is to provide a power supply chain, and carriers therefor, having end-to-end rollers in channels of the carrier cross-pieces and in addition one or more roller separators disposed transversely between the cross-piece rollers to define multiple openings for confining and grouping power conudits of one type and/or size in an opening and one or more power conduits of different type and/or size in another opening of the carrier.

SUMMARY OF THE INVENTION

The present invention provides a power supply chain comprising a plurality of power supply conduit carriers including first and second side links and first and second cross-piece members connected between the side links to form the carrier. The cross-piece members each comprise an elongated cross-piece member having a channel extending along the length thereof and a plurality of cylindrical rollers disposed end-to-end along the length of and residing in the channel for rotation in the channel relative to the cross-piece member.

One or more transverse roller separators is/are disposed between facing rollers in the cross-piece channels. Each roller separator includes opposite ends rotatably received in the facing cross-piece rollers for rotation about the longitudinal axis of the roller separator. Typically, each roller separator includes an intermediate cylindrical roller region for engaging one or more power supply conduits and smaller diameter cylindrical end studs or shafts that are rotatably received in corresponding bores in the respective facing cross-piece rollers so that the separator roller can freely rotate on the facing cross-piece rollers. Although mounting of the roller separator on the particular facing cross-piece piece rollers renders them non-rotatable in the channel, remaining cross-piece rollers continue to be freely rotatable in the channels.

The present invention is advantageous in that one or more roller separators can be initially positioned, or later repositioned, at various lateral locations between the cross-pieces as needed for a particular service application to confine and support various arrangements and types of power supply conduits. Moreover, the carrier is easily assembled by positioning the cross-piece rollers in the respective cross-piece channels, positioning the roller separator(s) transversely between facing cross-piece rollers having appropriate bores to receive the end shafts of the roller separator(s), and then fastening the cross-piece members between the side links by fasteners or other means.

For maintenance purposes, one or more cross-piece rollers can be readily removed from the channel for replacement, if necessary, by unfastening the cross-piece members from the side links, removing the roller(s) through the open end of the channel, and positioning the replacement roller(s) in the channel. The roller separator(s) similarly can be readily removed from the facing cross-piece rollers for replacement or repositioning. The cross-piece members then are fastened to the side links.

The present invention as well as objects and advantages thereof will become more readily apparent from the following detailed description taken with the following drawings.

DESCRIPTION OF THE INVENTION

Figure 1:
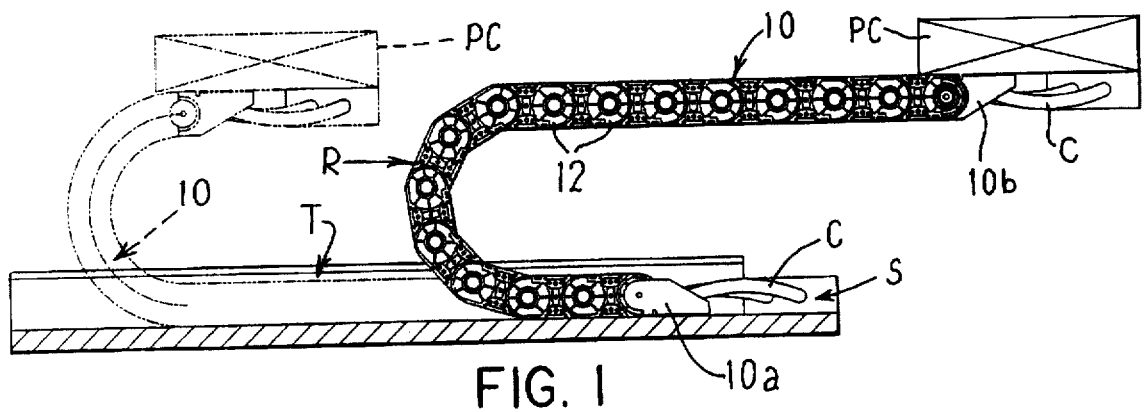
FIG. 1 is a schematic elevational view of power supply chain between a stationary power supply source and a relatively movable power consumer.

Referring to FIG. 1, a power supply chain 10 comprises a plurality of carriers 12 pivotally connected end-to-end in conventional manner to form an elongated flexible support chain that extends from the statonary power source S, such as electrical power supply cables C, in a reverse bend R to a movable power consumer PC to accommodate movement of the power consumer PC relative to the power source S. The power supply chain 10 is shown in FIG. 1 in dashed lines at a starting position and in solid lines at an extended position to accommodate movement of the power consumer. The power supply chain 10 optionally can reside partially in a stationary guide tray T shown schematically in FIG. 1 and extend out of the open upper side of the guide tray in conventional manner for movement as needed to accommodate movement of the power consumer PC. The power consumer PC can comprise a variety of power consuming equipment, such as a crane, a machine tool slide, a conveyor, etc. having an electrical or fluid powered motor of conventional type. The power supply chain 10 includes a stationary end 10a proximate the power source S and an opposite end 10b fastened to the power consumer PC for movement therewith.

Figures 2, 3:
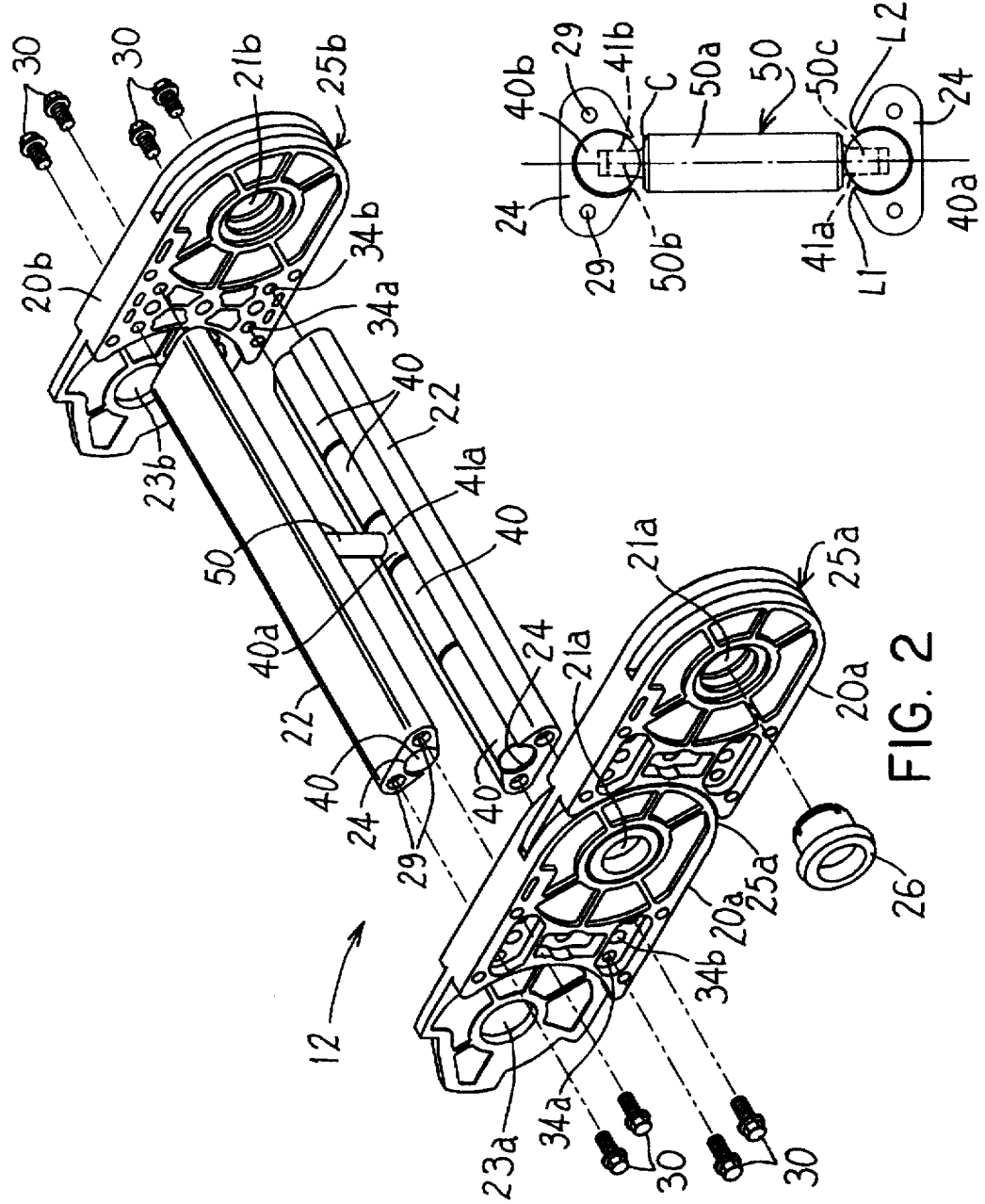
FIG. 2 is an exploded, perspective view of a power supply chain carrier in accordance with an embodiment of the invention with a side link 20a of an adjacent carrier shown to illustrate pivotal interconnection of adjacent carriers.
FIG. 3 is an end elevational view of a roller separator having end shafts rotatably received in bores of facing cross-piece rollers.

Referring to FIGS. 2–3, a carrier 12 constructed pursuant to an embodiment of the invention is illustrated. The other carriers 12 connected between the chain ends 10a and 10b are of like construction. Each carrier 12 includes first and second, generally parallel metal or plastic side links 20a, 20b connected together by first and second elongated cross-piece bars or members 22 extending between the side links in a direction perpendicular to the length of the chain 10.

The side links 20a, 20b each are elongated in the direction of the chain length and include pivot openings 23a, 23b at one end that are received in the forked yokes 25a, 25b of the end of the next adjacent side link in alignment with the respective pivot openings 21a, 21b of the yokes. A pivot pin 26 (only one shown) extends through each respective set of aligned openings 21a, 23a and 21b, 23b of the adjacent carriers in conventional manner to pivotally interconnect adajacent carriers 12. In this way, the power supply chain 10 is rendered flexible so that the chain can be configured in the reverse bend R to accommodate movement of the power consumer PC relative to the power source S.

The cross-piece members 22 are identical and include a C-shaped, elongated channel 24 extending along the complete length of the member 22 so as to provide a channel 24 having open ends. The cross-piece members 22 typically comprise extruded aluminum bars, although the invention is not so limited. As is apparent in FIG. 2, the C-shaped channels 24 face each other when fastened between the side links 20a, 20b to form the carrier.

The cross-piece members 22 include a pair of tapped (threaded) holes 29 at each end for receiving a pair of threaded fasteners 30 that extend through openings 34a, 34b in the side links 20a, 20b as will be apparent from FIG. 2. The cross-piece members 22 thereby are rigidly connected between the side links 20a, 20b to provide relatively rigid carrier 12.

A plurality of cylindrical rollers 40 are disposed in end-to-end array along the length of and residing in the channel 24 of each cross-piece member 22. There is a radial clearance between the rollers and the arcuate (partially cylindrical) wall defining the C-shaped channel 24 so that the rollers 40 are freely rotatable in the channel 24 relative to the cross-piece members as a result of engagement with one or more power supply conduits C (two shown), such as one or more electrical cables, fluid hoses, and the like, received in the carrier 12. A typical diameter of the channel 24 is 0.50 inch and diameter of the cross-piece rollers 40 is 0.48 inch to provide a radial clearance therebetween of about 0.01 inch. The end-to-end clearance of adjacent rollers 40 typically is 0.01 inch to provide axial free-play. The ends of the rollers 40 may have an optional circumferential chamfer or bevelled surface C transitioning from the axial ends to the cylindrical roller side as described as a result of deburring the roller ends as described in copending application Ser. No. 08/434,740, the teachings of which are incorporated herein by reference.

The rollers 40 preferably comprise low friction material, such as plastic having lubricant dispersed therein molded to cylindrical shape. Rollers comprising nylon material having a lubricant, such as molybdenum disulfide or teflon dispersed therein, are useful to this end, although hardened metallic rollers, such as hardened steel can be used as well.

The wall defining the C-shaped channel 24 of the cross-piece members 22 is configured to overlie or encompass the rollers 40 over a majority of their circumference (e.g. at least about 75% of the roller circumference) as best illustrated in FIG. 3. In this way, the rollers 40 are sufficently confined in the channel 24 so as to prevent unintentional movement of the rollers 40 out of the channel 24 and to maintain roller orientation axially in the channel 24 so as to minimize off-axial wobbling of the rollers as they rotate by engagement with the power supply conduit(s) received in the carrier 12.

At the same time, a sufficient region of the rollers 40 is exposed for engagement with the power supply conduit(s) C in the carrier without the conduit(s) C engaging the cross-piece members 22. To this end, the rollers 40 extend about 0.12 inch beyond a plane P intersecting the opposing sides lips L1, L2 of the channel 24, FIG. 3. Although six rollers 40 are shown in FIG. 2 residing in the channel 24, the invention is not so limited and can be practiced using fewer or greater numbers of rollers.

In accordance with the present invention, one or more roller separators 50 are rotatably disposed between facing rollers 40a, 40b in the cross-piece channels 24 with the longitudinal roller axis A generally perpendicular to the cross-pieces 22. The roller separator 50 typically includes a relatively large diameter cylindrical intermediate roller region 50a for engaging one or more power supply conduits and smaller diameter cylindrical end studs or shafts 50b, 50c at opposite ends of the intermediate roller region. The end studs or shafts 50b, 50c are rotatably received in corresponding cylindrical bores 41a, 41b of the respective facing cross-piece rollers 40a, 40b so that the separator roller 50 can freely rotate about its longitudinal axis A on and between the facing cross-piece rollers 40a, 40b. The facing cross-piece rollers 40a, 40b that support each roller separator 50 are rendered nonrotating in the channels 24 as a result of the roller separator 50 being mounted therebetween. However, the other remaining cross-piece rollers 40 in the channels 24 continue to be freely rotatable therein when engaged by the power supply conduits.

The roller separator(s) 50 can comprise the same low friction material described hereabove as the cross-piece rollers 40 disposed in the channels 24. That is, the roller separators 50 can comprise low friction material, such as plastic having lubricant dispersed therein molded to cylindrical shape, hardened steel and the like.

For purposes of illustration and not limitation, the roller separator(s) 50 can include an intermediate region 50a with a diameter of 0.38 inch and end studs or shafts 50b, 50c with a diameter of 0.19 inch when the cross-piece rollers 40 have diameter of 0.62 inch. The length of the roller separator 50 can be selected in dependence on the separation between the cross-piece members 22. For example only, for a separation of the cross-piece members 22 of 1.25 inches, the length of the intermediate region 50a of the roller separator 50 can be 1.20 inch and the length of each end stud or shaft 50b, 50c can be 0.25 inch. The diameter and length of the bores 41a, 41b can be 0.22 inch and 0.30 inch, respectively, when the diameter and length of the end studs or shafts 50b, 50c is 0.19 inch and 0.25 inch, respectively.

The carrier 12 in accordance with the present invention is advantageous in that the cross-piece rollers 40 and roller separator(s) 50 reduce frictional wear of the power supply conduit(s) received in the carrier 12, while the construction of the carrier 12 is simplified and rendered flexible to accommodate a variety of power supply conduit configurations and sizes that could be encountered in a variety of service applications. For example, the roller separator(s) 50 can be initially positoned, or later repositioned, at various lateral locations between the cross-piece members 22 as needed for a particular service application to confine and support various arrangements and types of power supply conduits simply by arranging facing cross-piece rollers 40 with appropriate bores 41a, 41b in the desired locations in channels 24 and then mounting the roller separator(s) 50 between those facing cross-piece rollers 40a,40b at each selected location.

Figure 4:
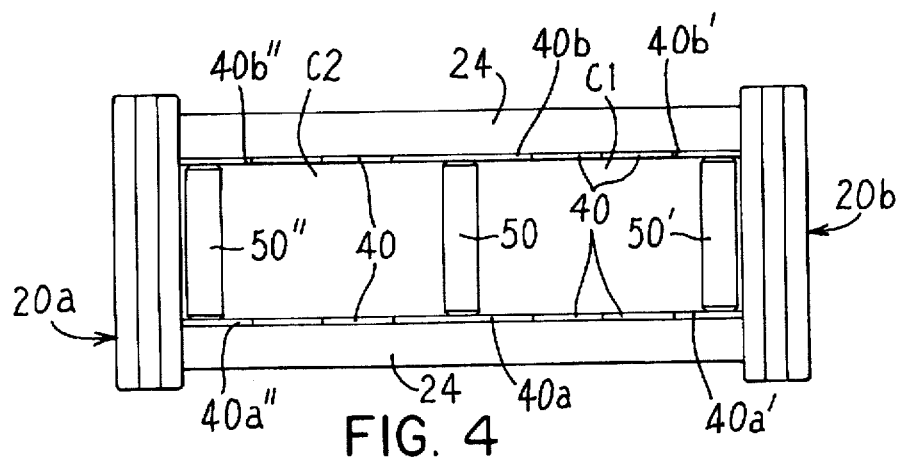
FIG. 4 is a side elevation of a chain carrier in accordance with another embodiment of the invention illustrating an intermediate roller separator disposed between a pair of roller separators laterally positioned adjacent the side links.

For example, referring to FIG. 4, a roller separator 50 is shown rotatably positioned at an intermediate location between facing cross-piece rollers 40a, 40b, and first and second roller separators 50', 50" are shown rotatably positioned between respective facing cross-piece rollers 40a', 40b' and 40a",40b" adjacent respective side links 20a, 20b. In this arrangement of cross-piece rollers and roller separators, two separate openings or compartments C1, C2 are defined in the each carrier 12 where, in each opening or compartment, the power supply conduit(s) are confined and supported on the upper and lower sides by the cross-piece rollers 40 and on the lateral sides by roller separators 50.

Moreover, assembly of the carriers 12 in accordance with the present invention is facilitated. For example, the carrier 12 is assembled by positioning the cross-piece rollers 40 and roller separators 50 in the channels 24 of each cross-piece member 22 at the appropriate locations. The cross-piece members 22 then are fastened to the side links 20a, 20b by the fasteners 30. Maintenance of the power supply chain 10 also is facilitated in that one or more of the cross-piece rollers 40 and roller separators 50 can be readily removed from the channel 24 of either cross-piece member 22 for replacement, if necessary. For example, one or more rollers 40 can be removed by unfastening the cross-piece members 22 from the side links 20a, 20b by unthreading the fasteners 30. The cross-piece rollers 40 then can be removed through an open end of the channel 24. One or more replacement roller(s) 40 can be positioned in the channel 24. Similarly, the roller separator(s) 50 can be removed from the facing cross-piece rollers 40a, 40b for replacement or repositioning as well when the cross-piece members 22 are disassembled. The cross-piece members 22 then are refastened to the side links 20a, 20b by the fasteners 30. Maintenance of the power supply chain thus is facilitated and rendered less time consuming.

Although the present invention has been described hereabove with respect to certain embodiments thereof, the invention is not so limited and modifications and changes can be made thereto without departing from the scope of the invention as set forth in the appended claims.

I claim:

1. In a power supply chain comprising a plurality of power supply conduit carriers, a carrier including first and second side links and first and second cross-piece members connected between the side links, said cross-piece members each having a channel extending along the length thereof and facing the channel in the other cross-piece member, a pluarlity of cylindrical rollers disposed end-to-end along the length of and residing in each channel for rotation therein relative to the cross-piece member, and a roller separator disposed transversely between facing rollers residing in said channels of said cross-pieces, said roller separator having opposite ends rotatably received in said facing rollers for rotation about an axis transverse to said cross-piece members, said facing rollers on which said roller separator is disposed being non-rotatable in said channels by virtue of said roller separator disposed therebetween.

2. The carrier of claim 1 wherein said facing rollers in said channels include facing bores that rotatably receive respective end shafts of said roller separator.

3. The carrier of claim 1 wherein a purality of roller separators are disposed transversely between the facing rollers residing in said channels of said cross-pieces to define multiple compartments for said power supply conduits.

4. The carrier of claim 3 including first and second roller separators disposed adjacent a respective first and second side link of each said carrier and a roller separator disposed at an intermediate location between said side links.

5. The carrier of claim 1 wherein said rollers and said roller separator comprise low friction material.

6. The carrier of claim 5 wherein the rollers and roller separator comprise plastic having a lubricant dispersed therein.

7. The carrier of claim 5 wherein the rollers and roller separator comprise hard metal.

8. The carrier of claim 1 wherein each cross-piece member is configured to encompass the rollers in the channels over a majority of their circumference as they rotate in the channel.

9. The carrier of claim 8 wherein each cross-piece encompasses about 75% of the circumference of the rollers.

10. The carrier of claim 9 wherein a radial clearance is provided between a wall defining said channel and said rollers such that said rollers are freely rotatable in said channel.

11. The carrier of claim 1 wherein each cross-piece member comprises a metal extrusion.

* * * * *